April 5, 1938.  E. A. CORBIN, JR  2,112,830
MOLDING MACHINE
Filed Aug. 5, 1935  7 Sheets—Sheet 1

Fig. 1.

INVENTOR
ELBERT A. CORBIN, JR.
BY
ATTORNEY

April 5, 1938. E. A. CORBIN, JR 2,112,830
MOLDING MACHINE
Filed Aug. 5, 1935 7 Sheets-Sheet 2

April 5, 1938.    E. A. CORBIN, JR    2,112,830
MOLDING MACHINE
Filed Aug. 5, 1935    7 Sheets-Sheet 4

INVENTOR
ELBERT A. CORBIN, JR.
BY
ATTORNEY

April 5, 1938.  E. A. CORBIN, JR  2,112,830
MOLDING MACHINE
Filed Aug. 5, 1935  7 Sheets-Sheet 7

INVENTOR
ELBERT A. CORBIN JR.
BY Louis Necho
ATTORNEY

Patented Apr. 5, 1938

2,112,830

UNITED STATES PATENT OFFICE 2,112,830

MOLDING MACHINE

Elbert A. Corbin, Jr., Lenni, Pa.

Application August 5, 1935, Serial No. 34,789

5 Claims. (Cl. 22—31)

My invention relates to a new and useful molding machine and it relates more particularly, to a substantially automatic molding machine comprising two mold-forming units and an intermediate booking or closing unit by the intercooperation of which a complete mold is formed efficiently, expeditiously and at a greatly reduced cost.

To the above ends my invention relates to a molding machine of this character in which the mold-forming units are adapted for synchronous operation whereby the drag section is prepared by one of said units and deposited on the intermediate booking table in a position to receive the cope section which, in the meantime, has been prepared by the other of said units, together with means for effecting the automatic placing of the cope on the drag section, in closed or booked relation, to produce a complete mold.

My invention still further relates to a molding machine of this character, the two mold-forming units of which are each provided with a butt-off or ram head, which is not only automatic in its operation in connection with the jarring table with which it co-acts, but which is also automatically withdrawn into an out-of-the-way position after the jarring operation has been completed.

My invention still further relates to a molding machine of this character in which the booking or closing table is provided with cushioning means to absorb the impact incident to the placing of the mold sections thereon, thus eliminating any danger of damage to the mold.

My invention still further relates to a molding machine of this character in which each of the mold-forming units is actuated by a combination of air and hydraulic pressure whereby the parts are moved in a steady positive and cushioned manner as opposed to the jerky movement which will result from the use of air pressure or conventional, mechanical operating means alone.

My invention still further relates to a molding machine of this character, the step by step movements of each of the mold-forming units of which are controlled by a single operating mechanism comprising a multi-way valve having operating stages corresponding to the step by step operation of said units.

My invention still further relates to a molding machine of this character which is provided with suitable mufflers to silence and cushion the exhaust of pressure incident to the operation of the machine and in which the various locking and releasing mechanisms, and other moving parts, are at all times adequately protected from contact with the sand used in the preparation of molds, thus vouchsafing proper operation at all times and guarding against erosion of the parts, which would result if such parts are left exposed to the sand used in forming molds.

My invention still further relates to various other novel features of construction and advantages which will be more clearly set forth in the following specification, taken in connection with the accompanying drawings in which;

Figure 1:
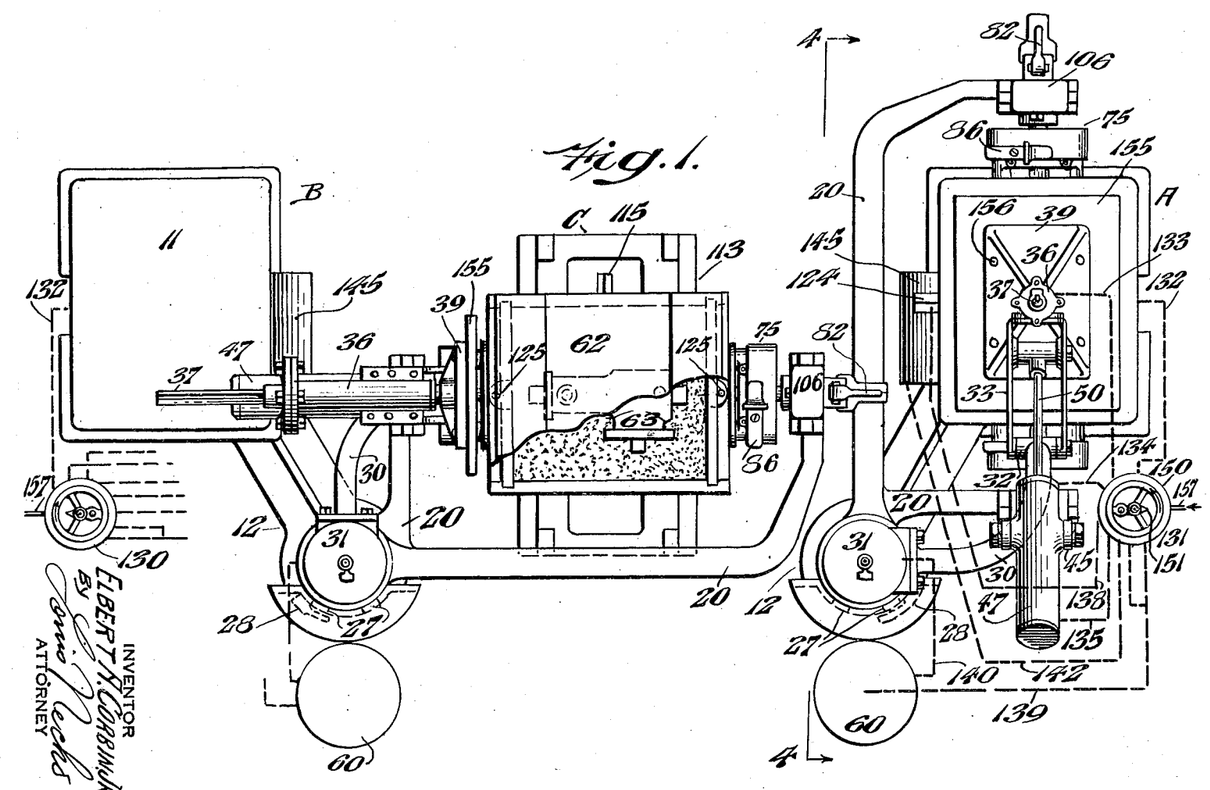
Fig. 1 represents a plan view of a molding machine embodying my invention.
Figure 2:
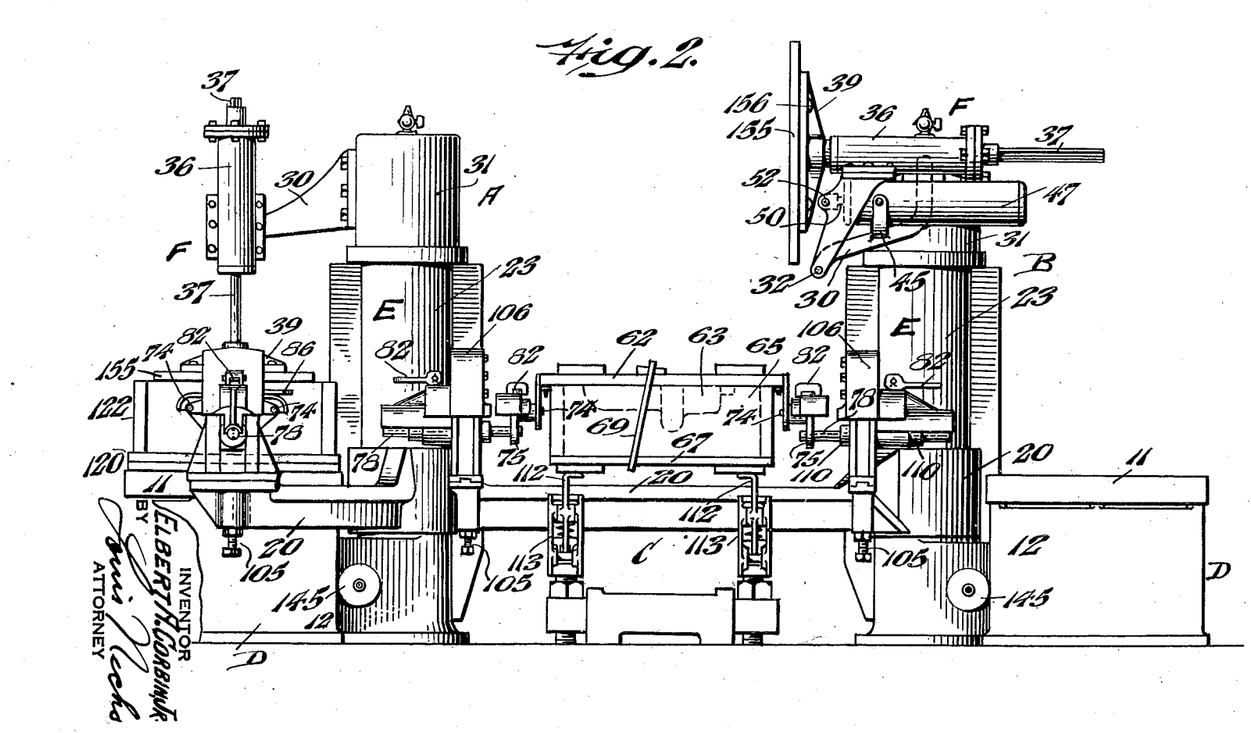
Fig. 2 represents a front elevation of Fig. 1.
Figure 3:
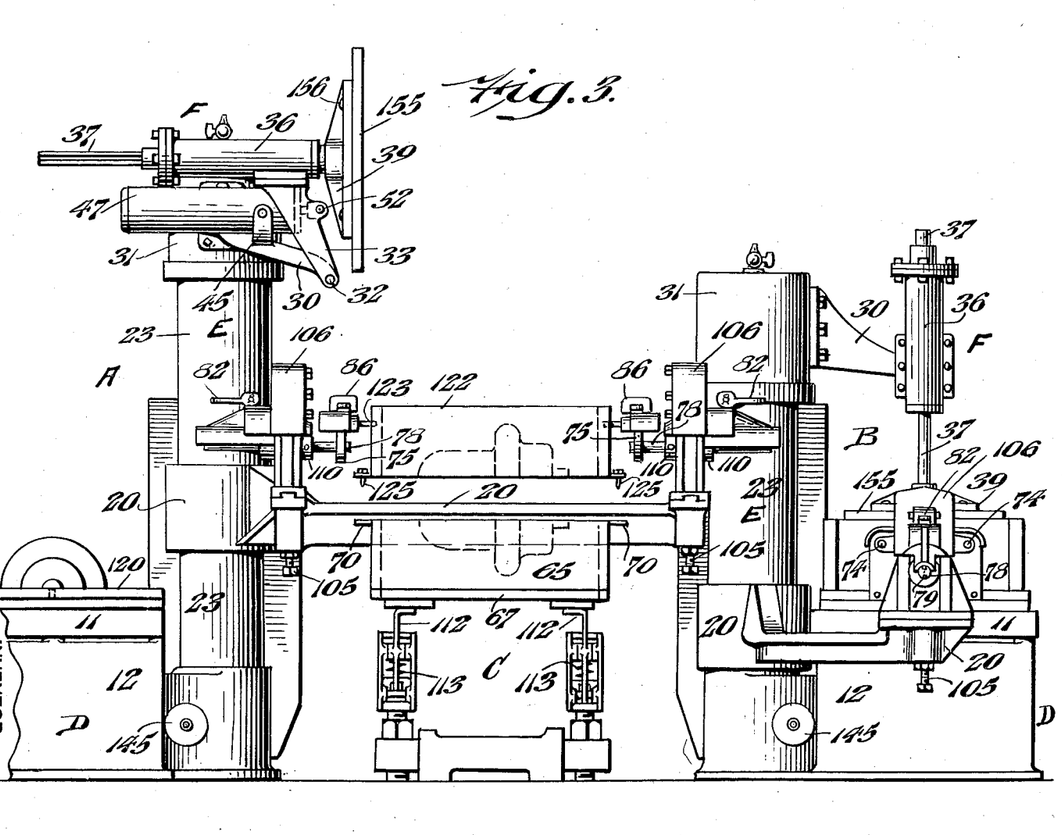
Fig. 3 represents a view similar to Fig. 2 showing the position of the parts when a drag section of a mold has been completed and when the cope section of said mold is about to be deposited on said drag section.

Referring to the drawings in which like reference characters indicate like parts and referring more particularly to Figs. 1, 2, and 3, it will be seen that my novel molding machine consists generally of two mold forming units generally designated as A and B with an intermediate mold-booking or closing unit C. The mold-forming units A and B are adapted for making the cope and drag sections of a mold respectively and interchangeably to the end that either of said units may be utilized to form the cope or drag section as desired.

For the purpose of this description it is assumed that the unit B is utilized for the forming of a drag section of the mold and that the unit A is utilized for forming the cope section.

Taking up the unit B it will be seen that it comprises a jar-ramming table D which consists of the reciprocating head 11 and the housing 12, which encases the mechanism for actuating the reciprocating head 11.

Co-acting with the jar-ramming table D is a combined jolt butt-off and crane actuating mechanism generally designated as E. The crane mechanism serves to actuate the crane 20 which is adapted to carry the completed drag section off the jar-ramming table D, and to deposit it on the booking or closing table C, and also to bring the jolt butt-off head into and out of alignment or registration with the flask section being formed on the jar-ramming table D. The mechanism E for actuating the crane 20 and for swinging the jolt butt-off F into and away from alignment with the jar-ramming table is substantially the same as that shown in the prior patents to Morris et al., Numbers 1,782,762, 1,786,672, and 1,784,995, in that it utilizes a piston 22 over which reciprocates the cylinder 23, which is actuated by air pressure delivered at 24 through the pipe 25. The cylinder 23 is also provided with a pin 26 which travels in the cam slot 27 and is guided by the cam latch 28, all as fully described in the patents referred to. Since the particular actuating mechanism used in this construction is substantially the same as that disclosed in the patents, and since its purpose is merely to actuate the crane 20 to carry the mold section from the jar-ramming table D to the booking table C, it is not believed necessary to describe this actuating mechanism in greater detail in this application. In the prior patents referred to, the jolt butt-off F was carried by the vertically, reciprocable cylinder herein numbered 23, and was manually swung into and out of operative alignment with, and manually raised and lowered with respect to the mold section being formed. This practise was highly disadvantageous in that it was extremely difficult and tiring to the operator repeatedly to manipulate the usually very heavy jolt butt-off and the uncontrolled position of the jolt butt-off constituted a serious hazard and a source of frequent and accidental injury.

Figure 7:
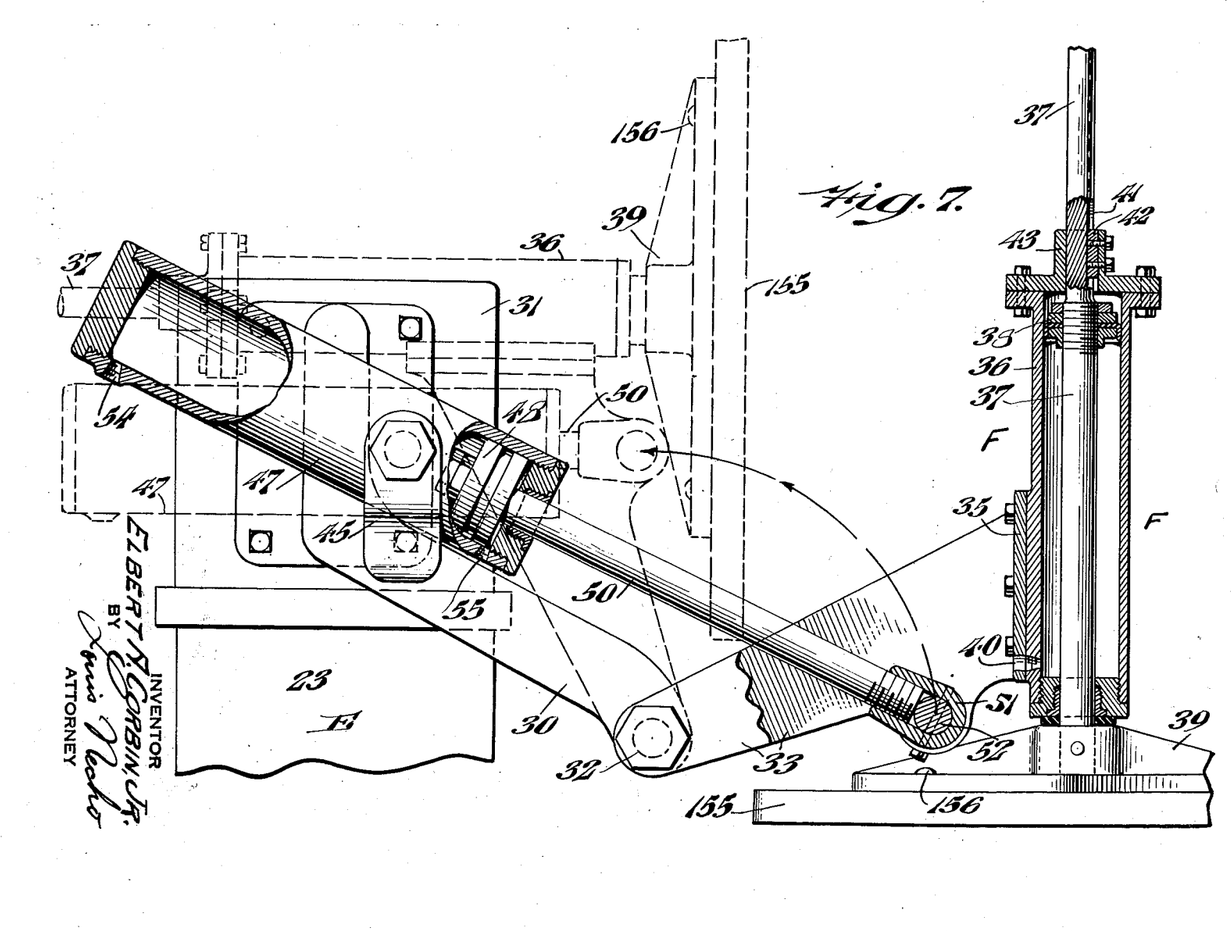
Fig. 7 represents, on an enlarged scale, a diagrammatic view, partly in elevation and partly in section, showing the construction and operation of the jolt butt-off forming part of my invention.
Figures 8, 9:
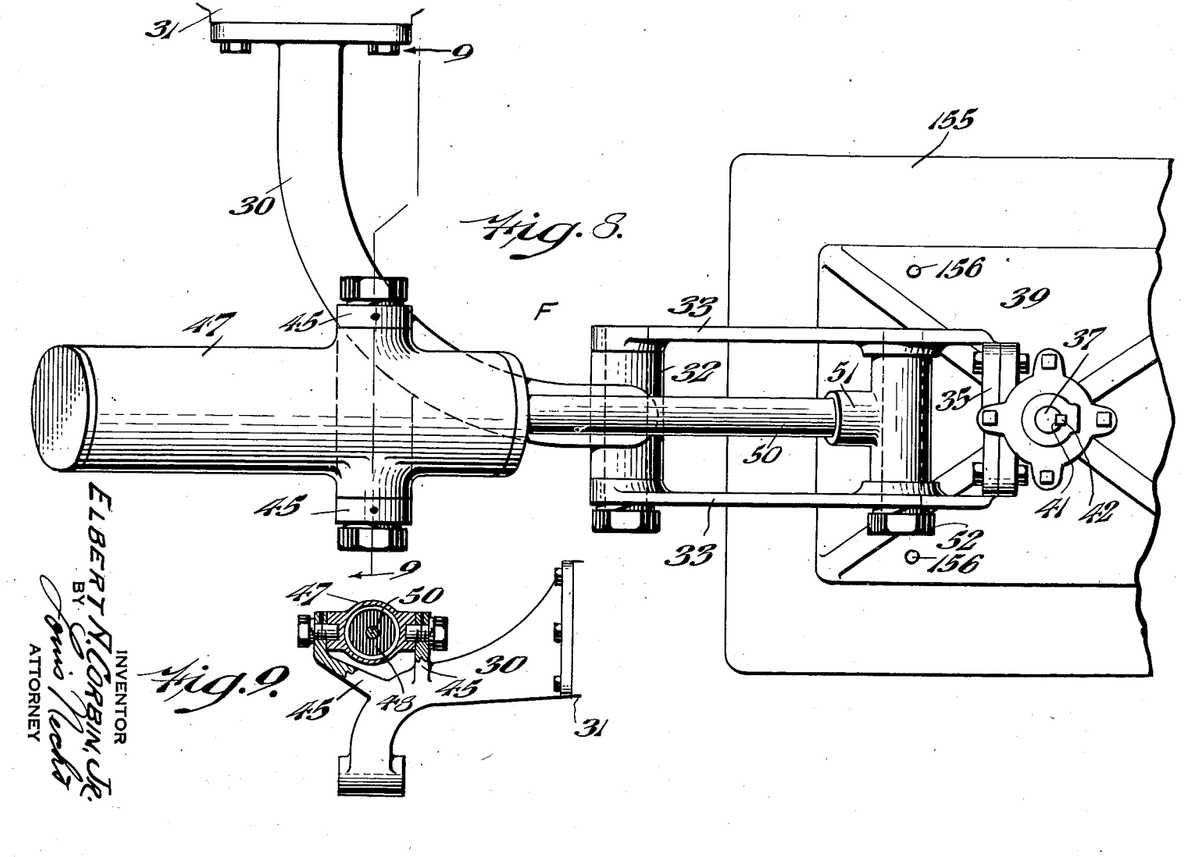
Fig. 8 represents a diagrammatic plan view of the jolt butt-off mechanism illustrated in Fig. 7.
Fig. 9 represents, on a reduced scale, a section on line 9—9 of Fig. 8.

In my novel construction I provide means for complete automatic operation of the jolt butt-off F and means for automatically moving and maintaining the jolt butt-off in an out-of-the-way position when not in actual use, thereby eliminating all the labor incident to the operation of the jolt butt-off and eliminating all hazard of injury. Thus, as will be seen from Figs. 7 and 8, my jolt butt-off F is carried by the arm or bracket 30 which is rigidly secured to the upper portion 31 of the cylinder 23. To the outer end of the arm 30 is pivoted at 32 the yoke 33, the outer end of which is secured at 35 to the cylinder 36 in which reciprocates the piston rod 37 which has at its upper end the piston head 38 and which carries at its lower end the platen 39. The platen 39 is raised by air pressure delivered through the inlet 40 and is adapted to drop by gravity when the pressure below the piston 38 is exhausted. To prevent rotation of the piston rod and the platen 39 with respect to the corresponding flask section, I provide the key-way 41 engaged by the key 42 in the boss or hub 43 on the head of the cylinder 36, it being understood that any other suitable means may be employed. From the arm 30, or suitably secured thereto, extend the brackets 45 on which is pivoted the cylinder 47 in which reciprocates the piston 48 carried by the piston rod 50, the lower end of which is threaded into the bearing 51 which is pivoted on the pin 52. The cylinder 47 is provided with the combined air pressure inlets and outlets 54 and 55 at either end thereof to receive and exhaust the pressure for reciprocating the piston 48 therein. Thus, assuming the platen 39 to be in the position shown in dotted lines in Fig. 7, and assuming that it is desired to move it into position shown in solid lines in this figure, pressure is admitted at the inlet 54 and exhausted at the inlet 55, and if it is desired to reverse the position of the platen from the position shown in solid lines, into the position shown in dotted lines in Fig. 7, the air pressure is exhausted at 54 and air pressure is admitted at 55. Thus, it will be seen that the cylinder 47 is double acting in that it is adapted to receive and exhaust pressure at either end thereof on either side of the piston 48 to reciprocate the platen of the jolt butt-off F from its operative position, in alignment with the mold section being jar-rammed, into an out-of-the-way position during the transfer of the mold section from the jar-ramming table D to the mold-booking or closing table C. In this connection it is to be understood that when the platen 39 is in the position shown in dotted lines in Fig. 7 it is on a "dead center" and it will remain in that position until air pressure is introduced at 54. Since the jolt butt-off, in its entirety, is carried by the head 31 of the cylinder 23, which also carries the crane 20 which removes the flask section from the jar-ramming table D to the booking table C, it will be seen that the platen 39 and the entire jolt butt-off construction F is also swung around with the crane 20, as will best be seen from Figs. 1, 2, and 3.

In the prior patents referred to, as well as in the prior art, as known to me, air pressure alone was utilized for actuating the crane operating mechanism E thus resulting in jerky, uneven motions. To overcome this difficulty I employ the pressure tank 60 which is filled up to the proper level (preferably within 2 or 3 inches of the top thereof) with liquid, the air pressure being then applied at the top of the liquid, thus obtaining a combined hydro-pneumatic pressure which results in a smooth, steady and even movement of the cylinder 23, which carries the crane 20 and the jolt butt-off head F.

The operation is as follows; beginning with the preparation of the drag section a pattern board 62, having a portion of a pattern 63 mounted thereon, is placed, pattern side up, on the jar-ramming table D of the mold forming unit B. A flask 65 is then placed over the pattern board and sand is poured over the pattern. The jolt butt-off mechanism F is then actuated to lower the platen 39 into contact with the top of the sand in the flask 65. The jar-ramming table D is then actuated compactly to pack the sand around the pattern section 63. When the sand has been properly packed, the jolt butt-off head is moved from the position it occupies in solid lines in Fig. 7 to the position it occupies, in dotted lines in Fig. 7, and a bottom board 67 is then placed at the top of the inverted flask and secured to the flask by the clamps 69. By reference to Fig. 10, it will be seen that the flask 65 is loosely secured to the pattern board 62 by means of the eyes 70 which engage aligning pins 71 which serve to effect accurate placement of the flask with respect to the pattern board. To the pattern board is rigidly and permanently secured the plate 72 which is provided with the spaced eyes 73 which are adapted to engage the pins 74 of the trunnion heads 75. The trunnion heads 75 are mounted on corresponding shafts 78 which have key-ways 79 normally engaged by the pins 80 which are pressed by the springs 81. This prevents the turning of the shaft 78 until the pins 80 are disengaged from the key-ways 79 by manipulation of the latch mechanism 82. Thus, when the latch 82 is raised in the direction of the arrow in Fig. 10, to ride on the cam 83 thereof, the pin 80 is pulled out of engagement with the key-way 79. In this position it is possible to turn the flask 65 from the inverted position shown in Fig. 10 to the right-side up position on the booking table as shown in Figs. 1, 2 and 3.

Figures 10, 11, 12, 13:
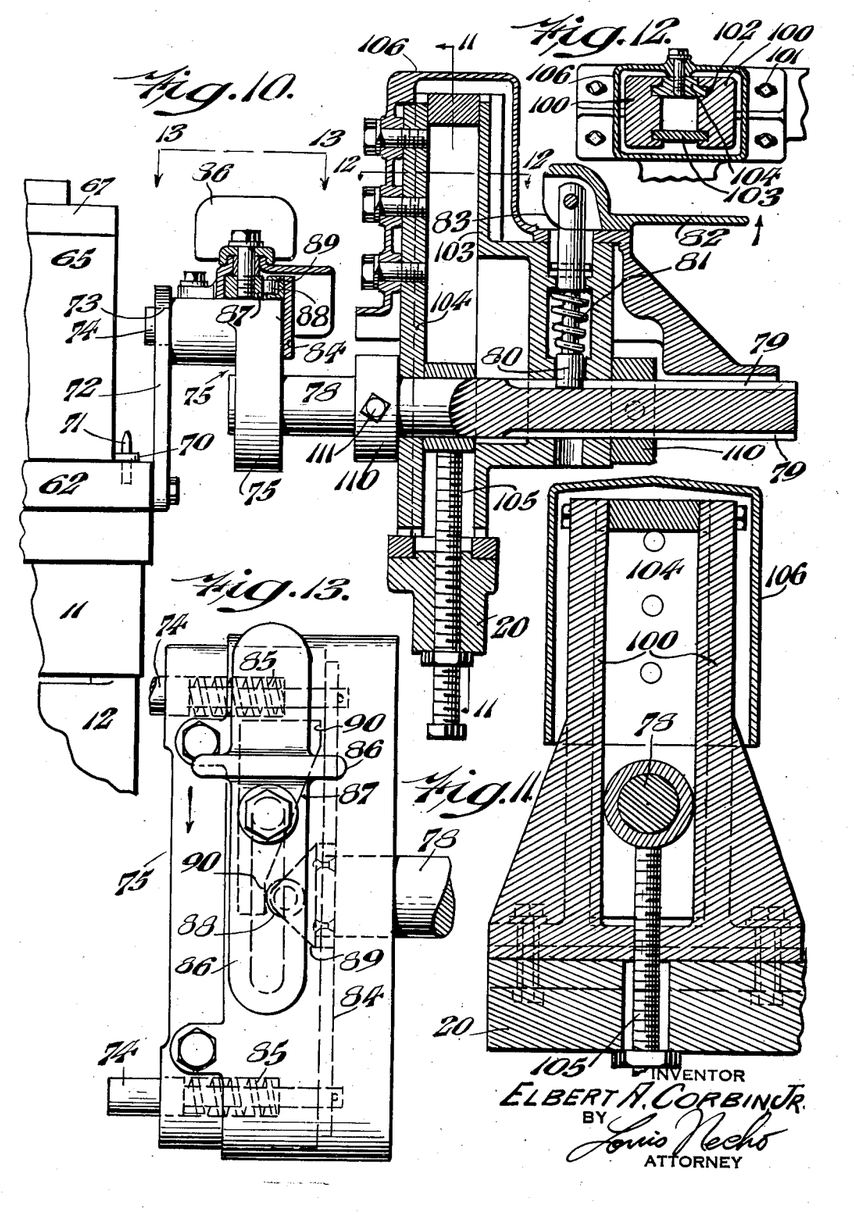
Fig. 10 represents, on an enlarged scale, a fragmentary view, partly in section and partly in elevation of the trunnion head forming part of my invention.
Fig. 11 represents a section on line 11—11 of Fig. 10.
Fig. 12 represents, on a reduced scale, a section on line 12—12 of Fig. 10.
Fig. 13 represents a plan view looking down in the direction of the arrows 13—13 in Fig. 10.

Inasmuch as it is necessary during the jar-ramming operation to disconnect the flask 65 from the trunnion heads 75 to permit free movement thereof, I have provided the latch mechanism, best illustrated in Figs. 10 and 13, in which it will be seen that the pins 74 are carried by the yoke 84 and are normally pressed outwardly into engagement with the eyes 73 by the springs 85. When it is desired to disengage the pins 74 from the eyes 73, it is merely necessary to slide the latch 86 in the direction of the arrow in Fig. 13 to bring the wedge shaped member 87 to bear against the roller 88 which is carried by the bracket 89, which in turn is secured to the yoke 84. This serves to pull the yoke 84 and the pins 74 away from the flask 65 and thus disengage the pins 74 from the eyes 73 in the plate 72. In order to retain the pins 74 in either of their engaging or disengaging positions, I provide the wedge shaped member 87, with the flat portions 90 which, when in engagement with the roller 88, serve to retain the parts stationary against accidental movement. When it is desired to engage the pins 74 with the eyes 73, the latch 86 is pushed in the reverse direction to bring the parts into the position shown in Fig. 13, in which the pins 74 are in their outermost position.

To guard against the possibility that the operator might forget to disengage the trunnion pins 74 from the eyes 73, which would otherwise result in damaging the machine, I have provided an auxiliary safety arrangement, best seen in Figs. 10, 11, and 12, and which consists of the brackets 100 which are bolted or otherwise secured at 101 to the respective ends of the crane 20. The brackets 100 are provided with the guide ways 102 in which are vertically movable the slides 103 and 104, which form the housing for the shaft 78, so that the entire construction shown in Fig. 10 may freely reciprocate vertically during the jar-ramming operation of the flask in the event that the operator forgets to disengage the pins 74 from the eyes 73 in the pattern board plate 72. Secured to one of the brackets 104 is a casing 106 which adequately protects the internally lubricated moving parts from contact with the sand utilized in the forming of the mold, thus insuring perfect and easy operation of the parts and guarding against undue wear and tear. The shaft 78 is provided with the stationing collars 110 which are fastened by the set screws 111, and which permit adjustment of the entire construction to flasks of different sizes. The shaft 78 (and entire construction carried thereby) is vertically adjustable to accommodate molds of various weights by turning the screw bolt 105 which engages and passes through the end of the crane 20.

The completed drag section of the mold is then carried by the crane 20, and due to its unbalanced position, it automatically turns about the trunnion shaft 78 (after the latch 82 has been released) so as to assume the position seen in Figs. 1, 2, and 3. With the drag section, which was initially formed up-side-down, now turned right-side-up, the crane 20 carries the drag section and deposits it on the booking table C where it rests on the legs 112 which are cushioned by the springs 113. The clamp 69 is then removed and the vibrator is operated to loosen the drag pattern section 63 from the sand packed around it, without disturbing the contour of the mold. The crane 20 then raises the pattern board 62 off the drag section 65 and while the pattern board is being returned to the jar-ramming table D of the unit B, it is turned over to bring the pattern portion uppermost before it is deposited on the jar-ramming table in a position to receive the next flask.

Figures 4, 5, 6:
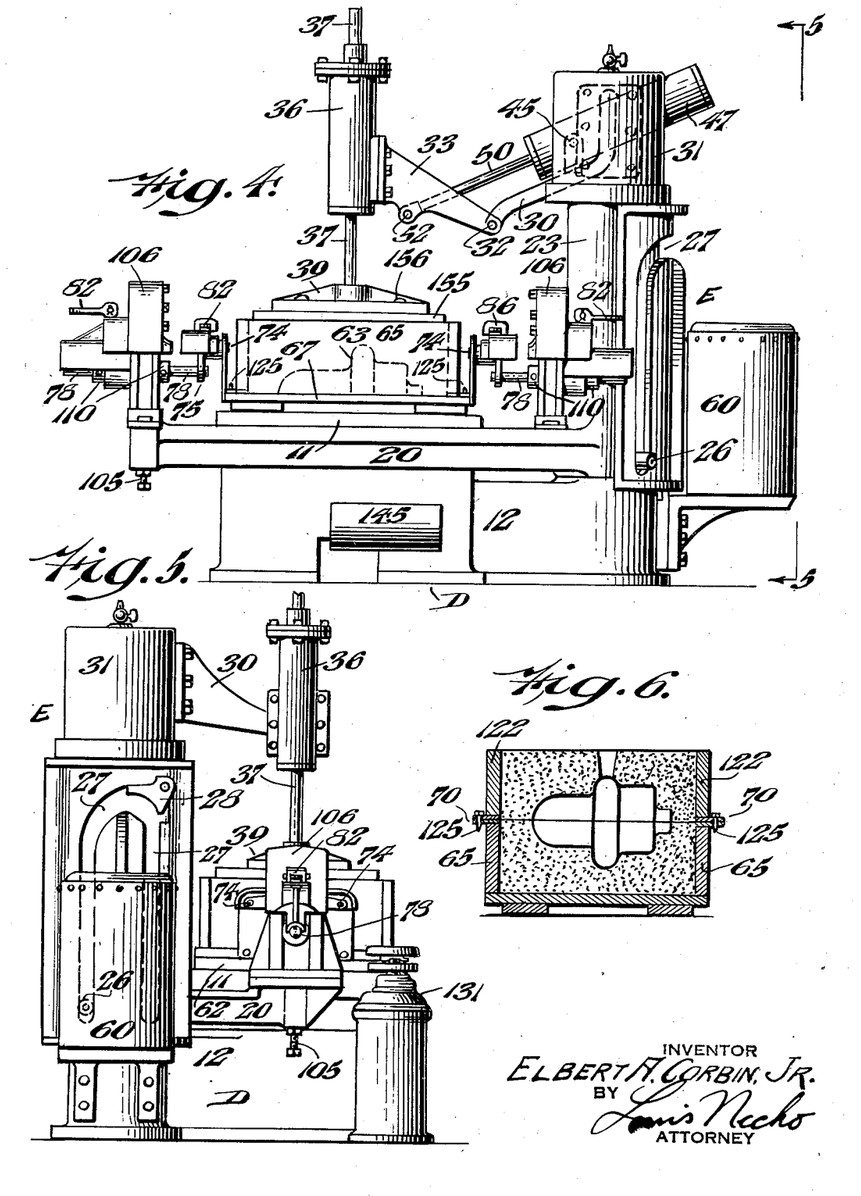
Fig. 4 represents an end elevation of one of the mold forming units of the machine looking in the direction of the arrows 4—4 in Fig. 1.
Fig. 5 represents an end elevation of the unit shown in Fig. 4 looking in the direction of the arrows 5—5 in Fig. 4.
Fig. 6 represents a vertical cross section of a completed mold flask ready for pouring.

With the drag section of the mold thus completed, and deposited on the booking table C, we now revert to the mold forming unit A which in this instance has been forming the cope section of the mold. The operation of forming the cope section of the mold is substantially identical with that of forming the drag, except that, the pattern board 120 of the cope is (detachably) secured to the jar-ramming table D of the unit A, and that the trunnion pins instead of engaging the pattern board 120, (as in the drag section), directly engage the cope flask 122, as at 123. Furthermore, in order to vibrate the cope pattern board 120 (by operating the vibrator 124) the pattern board 120 is rather loosely mounted on the jar-ramming table D of the unit A, thus permitting the vibration of the pattern board 120 independently of the jar-ramming table D. After the cope section 122 has been lifted from the pattern board 120, by the corresponding crane 20, it is raised and swung around to a position over the drag section 65, as best seen in Fig. 3. The cope section 122 is provided with the bottom pins 125 which are adapted to engage the eyes 70 at the top edge of the drag section 65, as best seen in Figs. 3 and 6. With the pins 125 engaging the eyes 70, the flask sections 65 and 122 are clamped together and are removed from the booking table C by a conveyor, not here shown, but which is fully disclosed and claimed in application No. 743,682, filed by Morris et al. on September 12, 1934.

In order to effect a step by step operation of the machine, I provide each of the units A and B with the multi-way valves 130 and 131, respectively. From the valves 130 and 131 extend pipes 132 leading to the jar-ramming tables D, pipes 133 leading to the cylinders 36 to raise and lower the platens 39, the pipes 134 and 135 leading to either end of the cylinders 47 to tilt the jolt butt-off heads into and out of the operative and inoperative positions seen in Fig. 7, the pipes 138 leading to the vibrators 115 and 124, and the pipes 139 leading to the hydro-pneumatic tank 60. From the hydro-pneumatic tank 60 extend the pipes 140 for operating the crane actuating mechanism E. 142 designates exhaust pipes leading to the mufflers 145, which silence the exhaust thus eliminating the very annoying noise and vibration that would otherwise result, and which very adversely effects the operators of the machines.

Each of the multi-way valves 130 is operated by the hand wheel 150 which is provided with a pointer 151 adapted, when the wheel is turned, to register with various indicia designating the various corresponding stages of operation. Thus, beginning with the pointer 151 registering with the "off" position, the crane 20 will be on the corresponding jar-ramming table D with the jolt butt-off mechanism F as shown in dotted lines in Fig. 7. When the pointer 151 is moved to its next position, the jolt butt-off head is moved from the position shown in dotted lines to the position shown in full lines in Fig. 7. The next movement of the pointer 151 results in dropping of the platen 39 into contact with the flask, as shown in Figs. 1, 2, and 3. When the pointer 151 is moved into the next position the jar-ramming table is brought into action. After the jar-ramming operation is completed the pointer 151 is moved into the next position to raise the platen 39 from contact with the flask into the position shown in solid lines in Fig. 7. From the position shown in solid lines in Fig. 7, the next step of the pointer 151 tilts the jolt butt-off head into the position shown in dotted lines in Fig. 7. The next position of the pointer 151 results in actuating the vibrator (115 or 124) to loosen the pattern section from the moulded sand. The next movement of the pointer 151 results in raising the cylinder 23 and the pin 26 in one side of the cam groove 27 until it passes the "dead center" thereof, whereupon the next station of the pointer exhausts the air to permit the pin 26 to descend on the other side of the cam slot 27, during which operation the crane 20 completes its swinging motion and deposits the flask section on the booking table C. The next step of the pointer 151 results in reversing the course of the crane 20 until it has reached "dead center", whereupon by cooperation of the latch 28, the pin 26 is thrown over the "dead center" of the cam slot 27 and the final step of the pointer 151 exhausts the air from the cylinder 23 and brings the parts back to the starting point, and the beginning of a new cycle of operation.

It is to be noted that the valve arrangement is such that the vibrators 115 and 124 begin to act immediately before and continue to act during part of the raising operation of the corresponding flasks, thus assuring proper separation of the corresponding pattern section from its corresponding mold.

In order to render the platen 39 adjustable to flasks of various sizes, I employ a wooden platen board 155 which is suitably secured in a detachable manner to the platen 39, as at 156. The multi-way valves 130 are supplied with compressed air through the inlets 157.

It will thus be seen that I have produced a substantially automatic molding machine having two mold forming units which are attended by two operators who conduct their respective operations in timed relation with each other, the operator forming the drag section beginning a few seconds in advance of the operator forming the cope section, thus resulting in uninterrupted formation of alternating drags and copes.

Having thus described my invention what I claim as new and wish to secure by Letters Patent is:

1. A molding machine comprising a mold-forming unit adapted to form the drag or cope section of a mold, said mold-forming unit including a jarring table and a jolt butt-off coacting therewith, a built-in crane supporting said jolt butt-off and adapted for removing a mold section from said jarring table, and means carried by said crane for swinging said jolt butt-off in a vertical arc about a horizontal axis and for bringing said jolt butt-off into operative position with respect to a mold section being formed on said jarring table and for withdrawing said jolt butt-off into an out-of-the-way position above the mold-forming unit during the removal of said mold section from said jarring table.

2. In a molding machine having a mold-forming unit, and a crane for removing a flask section from said mold-forming unit, a trunnion head carried by said crane, adapted, detachably, to engage said flask section comprising, a yoke, a plurality of pins carried by said yoke, springs for normally urging said pins outwardly with respect to said trunnion head and into engagement with said flask section, a roller carried by said yoke, a cam-surface associated with said roller for withdrawing said pins into said trunnion head and out of engagement with said flask section, a rectilinear-surface associated with said cam-surface and adapted to retain said pins against accidental displacement from either of their two positions, and a strike-latch for moving said cam and rectilinear surfaces with respect to said roller.

3. In a molding machine including a jarring table adapted to support a mold section being formed and a jolt butt-off adapted to cooperate with said jarring table, means for raising and lowering said jolt butt-off with respect to said mold section comprising, a cylinder adapted to be disposed vertically above said jarring table, a piston reciprocable therein and supporting said jolt butt-off and means for delivering compressed air to said cylinder to actuate said piston.

4. In a molding machine including a jarring table adapted to support a mold section being formed and a jolt butt-off adapted to cooperate with the top of said jarring table, means for raising and lowering said jolt butt-off with respect to said mold section comprising, a cylinder adapted to be disposed vertically above said jarring table, a piston reciprocable therein and supporting said jolt butt-off, and means for tilting said cylinder and jolt butt-off from its vertical operative position to a horizontal out-of-the-way position comprising, a support carried thereby, a piston reciprocable therein and connected to said jolt butt-off and means for supplying and exhausting compressed air for actuating said piston.

5. A molding machine comprising two mold-forming units adapted to form the drag and cope sections of a mold respectively, an intermediate mold-booking unit, and means for transferring the completed drag and cope sections from said mold-forming units to said mold-booking unit, each of said mold-forming units comprising a jarring table and a jolt butt-off coacting therewith, together with means for swinging said jolt butt-off in a vertical arc about a horizontal axis, and for bringing said jolt butt-off into operative relation with respect to the mold section being formed on said jarring table, and for removing said jolt butt-off into an out-of-the-way position above the mold-forming unit during the transferring of said mold section from the jarring table onto said booking unit.

ELBERT A. CORBIN, Jr.